PROTECTIVE COVER FOR VEHICLES

BACKGROUND OF THE INVENTION

This invention relates to protective covers for vehicles and more particularly to such covers constructed to have an oval or egg-shaped outer surface configuration to increase its structural strength and cause the deflection therefrom of objects striking it.

Vehicles, particularly heavy, earth-moving construction vehicles such as crawler tractors, bulldozers, crawler-type loaders, etc., are in constant danger from being struck by falling objects such as telegraph poles, trees, portions of buildings, etc. In addition, the uneven terrain on which they frequently operate can cause the vehicles to turn over. These represent grave dangers to the operator of the vehicle. To give the operator at least some protection guards have in the past been constructed over and around the driver's seat. Such guards are most effective in protecting the driver when struck by relatively light objects. Heavy objects, such as large diameter trees or the forces acting on the guard if the vehicle rolls over have so far been generally greater than the strength that could be built into such guards.

In the past the strengthening of the guard has been inhibited by the fact that the vehicle operator requires ready access to the driver's seat and that he must be in a position to fully view the surroundings so that workmen are not endangered. Exemplary of a prior art guard construction is U. S. Pat. No. 2,921,799 which provides a partially arcuate frame that is unsupported over more than 180° and carries a sun and rain cover for the convenience of the operator. U.S. Pat. No. 2,441,132 discloses another approach in which a cagelike structure of a semiarcuate construction fully encloses the upper portion of the vehicle. Although both of these constructions afford some protection to the vehicle operator neither one is capable of overcoming the aforementioned deficiencies. The mere use of heavier cross section structural members for the covers would prohibitively increase the weight and cost of the cover, would materially decrease the visibility afforded the driver and would in many instances still be insufficient for a proper protection of the driver from heavy, falling objects or from being crushed by the overturned vehicle.

SUMMARY OF THE INVENTION

The present invention provides a cover of a high structural strength which is formed so as to deflect striking objects. Briefly, the cover comprises a structure defined by arcuate, elongate cover members defining a plurality of arcuate, exterior roll surfaces. The roll surfaces spread outwardly from adjacent the vehicle frame, extend away from the frame and are joined at intermediate points to form continuous, oval roll surfaces disposed in a plurality of planes. Mounting means are further provided to secure the members to the vehicle frame.

In the preferred embodiment of this invention a screen is positioned intermediate at least some of the roll surfaces to prevent the penetration of relatively small objects into the space below the cover. The screen is constructed to permit the driver to view the surroundings of the vehicle therethrough.

The roll surfaces of the canopy slope downwardly from an uppermost point of each roll surface in opposing directions over an arc of more than 90°. Consequently, each roll surface defining cover member and the canopy as a whole have an egg-shaped or oval configuration to impart maximum strength, approaching that of a spherical structure, to the canopy for given size cover members. Heavy objects, such as a large diameter tree, which would crush prior art canopies constructed of the same cross section cover members as the canopy of the present invention are deflected and guided downwardly and away from the driver beneath the canopy to thereby protect the operator from serious injuries. The egg-shaped configuration of the roll surfaces and the arc of more than 180° prescribed by them assure that a striking object glances off the canopy, even if it strikes the canopy in a horizontal plane.

Aside from the stated advantages provided by the present invention the egg-shaped configuration of the canopy lets a rolling vehicle continue its motion from its inverted towards its upright position. This lessens the danger to the operator, who may be strapped into his seat and be unable to safely free himself while the vehicle is in an overturned position. Furthermore, this feature can prevent the need for special hoisting equipment to place the vehicle back into its upright position after it has rolled over.

BRIEF DESCRIPTION OF THE DRAWINGS

Other objects, features, and advantages of the present invention will be more apparent after referring to the following specification and attached drawings in which:

FIG. 1 is a side elevational view of a crawler-type earth-moving vehicle having a protective canopy constructed according to the present invention;

FIG. 2 is an enlarged side elevational view of the canopy;

FIG. 3 is an end view of the canopy shown in FIG. 2; and

FIG. 4 is a plan view of the canopy shown in FIG. 2.

DESCRIPTION OF THE PREFERRED EMBODIMENTS

Referring first to FIG. 1, a crawler-type tractor or vehicle 6 comprises a platform 8 on which a power plant 10 is mounted. A pair of endless tracks 14 looped over spaced-apart drive wheels 16 and carried by rollers 18 supports the vehicle on ground 12. A forward end 20 of the tractor pivotally mounts a working device such as a scraper blade 22 and includes means 24 for raising and lowering the blade. A driver's seat 26 is mounted to the platform rearwardly of power plant 10 and controls 28 are provided to permit the operation of the tractor. The tractor may further include an exteriorly mounted fuel tank 30 secured to the rear end of the tractor in a conventional and well-known manner.

Such vehicles are commonly employed around construction sites for highways, buildings, dams, etc. and are, therefore, subject to rough handling. In addition, at such construction sites it is not infrequent that objects, such as trees, telegraph poles, beams, etc. accidentally fall. This exposes the driver to the danger of being hit by such objects and suffering personal injuries of the most serious character. To shield and protect the driver the present invention provides a protective cover or canopy 32 which is secured to vehicle platform 8 and encloses the vehicle operator.

Referring to FIGS. 2—4, the canopy comprises a pair of parallel, spaced-apart frame members 34 disposed in vertical planes and straddling the longitudinal axis of the tractor. The frame members are egg-shaped, that is they are continuously arcuate over their full length between ends 36 of the members. The ends are secured to lower ends 38 of upright posts 40 which are mounted to vehicle platform 8 by brackets 42. Longitudinal frame members 34 extend over an arc greater than 180° so that portions 44 of the members adjacent upright post 40 spread outwardly from adjacent platform 8. Consequently, each frame member defines an outwardly facing roll surface 46 which extends from an uppermost point 48 of each member downwardly towards vehicle platform 8 in a continuously arcuate manner.

A pair of second or transverse frame members 50 lie in upright planes defined by posts 40 and are substantially perpendicular to longitudinal frame members 34. The transverse frame members are defined by a pair of continuously arcuate sections 51 extending from adjacent the lower end of post 40 to adjacent upper end 62 of the posts and by arcuate stiffeners 67 intermediate the upper portion of longitudinal frame members 34.

Ends 36 and 54 of frame members 34 and 50 are secured to upright posts 40 adjacent their lower ends 38 in a conventional manner as by welding. Gusset plates 60 are provided to strengthen and rigidify the joint. The intersection of the longitudinal frame members 34, sections 51, stiffeners 67 and upper ends 62 of upright posts 40 forms a joint 64, preferably

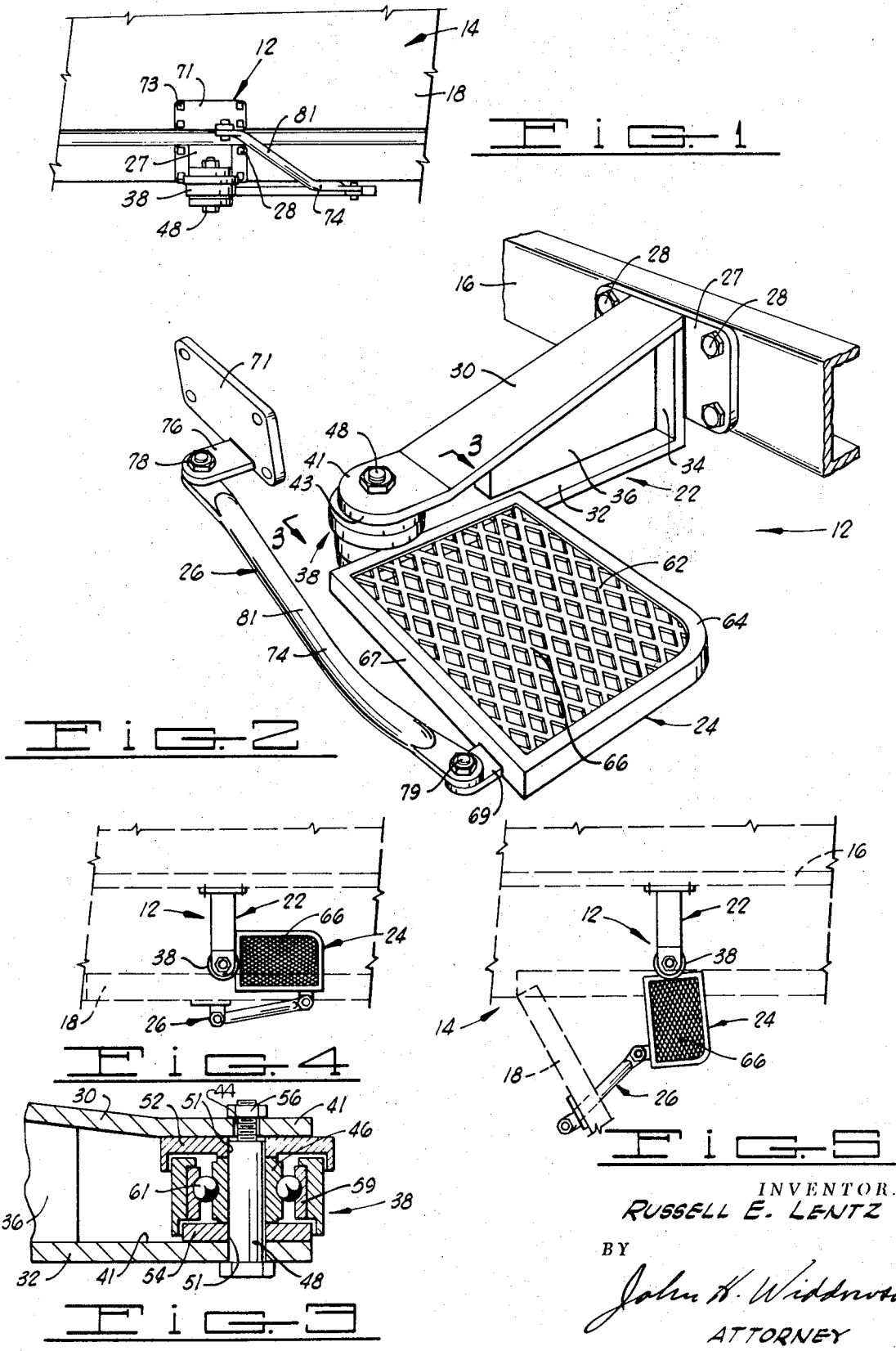

VEHICLE ENTRANCE STEP APPARATUS

Various types of vehicle step structures are known to the prior art operable to position a rod member or the like for aid in entering a vehicle through an entrance door. However, the prior art devices are complicated in structure, unreliable in strength and operation, and not operable to properly position a step area providing ease of entrance into a vehicle.

In one preferred embodiment of this invention, a vehicle entrance step apparatus is provided including a support assembly readily anchored to a channel member of a vehicle frame; a step assembly pivotally connected to the support assembly movable from a concealed position beneath the vehicle to a revealed position; and an actuator assembly connectable to a movable portion of the vehicle such as an entrance door and operably connected to the step assembly for moving the same. The support assembly includes a main base plate secured as by bolts to the vehicle frame having outwardly extended support arms with a bearing assembly mounted therebetween. The step assembly includes a main body section having a support frame about its periphery with the support frame connected at one end portion to the bearing assembly for pivotal movement therebout. The actuator assembly includes an anchor plate member secured as by bolts to an outer surface of the entrance door of a vehicle and a positioning arm member pivotally connected to the anchor plate member and an attachment lug on the body section of the step assembly. The spaced relationships of the anchor plate member and the connection through the positioning arm member to the step assembly relative to its connection to the bearing assembly is such that the positioning arm member is operable to pivot the main body section about the bearing assembly on movement of the vehicle door structure.

One object of this invention is to provide an entrance step apparatus readily mountable on vehicles overcoming the aforementioned disadvantages of the prior art devices.

One further object of this invention is to provide an entrance step apparatus having means for ready attachment to the frame of a vehicle; a step assembly pivotally connected to the attachment means; and an actuator assembly readily attachable to the step assembly and a movable portion of the vehicle such as a door member for moving the step assembly from a revealed to a usage position for ease of entrance into the vehicle.

Still, one other object of this invention is to provide an entrance step apparatus for vehicles which is sturdy in construction; economical to manufacture; easy to install; and being substantially concealed when in the nonusage condition.

Still, another object of this invention is to provide an entrance step assembly which automatically moves from a concealed to the usage condition on movement of an adjacent entrance door on a vehicle.

Various other objects, advantages, and features of the invention will become apparent to those skilled in the art from the following discussion, taken in conjunction with the accompanying drawings, in which:

FIG. 1 is a side elevational view of an entrance step apparatus of this invention as mounted upon the side of a vehicle;

FIG. 2 is an enlarged perspective view of the entrance step apparatus of this invention having a portion thereof connected to a support channel of a vehicle;

FIG. 3 is an enlarged fragmentary sectional view taken along line 3—3 in FIG. 2; and FIGS. 4 and 5 are top plan views illustrating movement of the entrance step apparatus from a concealed nonusage position to an extended usage position, respectively.

The following is a discussion and description of preferred specific embodiments of the new entrance step apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, an entrance step apparatus, indicated generally at 12, is shown as attached to a side portion of a vehicle 14. More particularly, the step apparatus 12 has a portion connected to a support channel 16 and, additionally, to a movable portion such as an entrance door 18 of the vehicle 14. The step apparatus 12 includes a support assembly 22 secured to the support channel 16; a step assembly 24 pivotally connected to the support assembly 22; and an actuator assembly 26 pivotally connected to the step assembly 24 and the movable entrance door 18 of the vehicle 14.

As best shown in FIG. 2, the support assembly 22 includes a base plate member 27 secured as by a plurality of bolt members 28 to the support channel 16; a pair of laterally extended support arms 30 and 32 secured as by welding to the base plate member 27 and a support plate member 34 therebetween; a gusset plate member 36 welded between the support arms 30 and 32 to provide substantial vertical rigidity; and a bearing assembly 38 mounted between the outer adjacent ends of the support arms 30 and 32. The upper support arm 30 is inclined downwardly and outwardly relative to the lower support 32 having an outer connector section 41 with a curved end surface indicated at 43. The support arm 32 has a similar connector section 41 so that both sections 41 are parallel and having aligned holes 44 therein.

As best shown in FIG. 3, the bearing assembly 38 is mounted between the support arms 30 and 32 having an inner race 46 secured in a press fit to an upright bearing shaft 48. More particularly, the bearing shaft 48 extends through holes 51 in upper and lower plate members 52 and 54 and the aligned holes 44 in the support arms 30 and 32. An upper threaded end portion of the bearing shaft 48 receives a nut member 56 thereon. The bearing assembly 38 further includes an outer race 59 operably connected to the inner race 46 for rotation thereabout through a plurality of ball members 61. Vertical movement of the outer race 59 is limited by the upper and lower plate members 52 and 54. It is seen that the outer race 59 is readily rotatable about the stationary bearing shaft 48 and the inner race 46 to provide pivotal movement to the step assembly 24 as will become obvious.

The step assembly 24 includes a main body 62 of grate construction supported about its perpherial edge by a frame 64 to form a step area 66 of generally rectangular shape. It is seen that the step area 66 can be of various sizes but preferrably of a size to readily receive one's foot thereon for aid in entering the vehicle 14. At one end of the main body 62 adjacent one corner thereof, the frame 64 is secured as by welding the rotatable outer race 59 of the bearing assembly 38 so that the same is pivotal thereabout. On a sidewall 67 of the frame 64 is secured a laterally extended connector tab 69.

As best shown in FIG. 2, the actuator assembly 26 includes a primary anchor plate 71 secured by bolts 73 to the exterior surface of the entrance door 18 of the vehicle 14 and connected through a positioning arm member 74 to the step assembly 24. More particularly, a second laterally extended connector tab 76 is secured as by welding to the anchor plate 71 having a hole therein to receive a bolt member 78 pivotally connected to one end of the positioning arm member 74. The opposite end of the positioning arm member 74 is also connected through a bolt member 79 to the other connector tab 69. As shown in FIG. 4, the positioning arm member 74 extends in a substantially common vertical plane but as shown in FIG. 1, the same is provided with the upper and lower ends in parallel spaced planes and a midportion 81 inclined downwardly from the anchor plate 71 to the step assembly 24. This downward projection of the midportion 81 is required so that the same does not contact the entrance door 18 of the vehicle 14 when moved to the open condition.

In the use and operation of the entrance step apparatus 12 of this invention, it is seen that the support assembly 22 is connected through the base plate member 27 to the channel 16 of the undercarriage frame of the vehicle 14 through the use of the bolt members 28. It is obvious that the positioning is chosen so that the step assembly 24 will achieve the proper concealed position when the vehicle entrance door 18 is closed and in the proper access area when the same is in the open position. This proper positioning can be readily ascertained on opening the entrance door 18 to its full condition and positioning the support assembly 22 in the proper anchored position on the channel member 16. Thereupon, the actuator assembly 26 is secured through the anchor plate 71 and the bolt members 73 to the outer surface of the entrance door 18 so that the step assembly 24 extends substantially perpendicular to the support arms 30 and 32 and positioned under the outer edge of the vehicle 14 in a concealed condition. Additionally, it is obvious that the positioning arm member 74 and the support arms 30 and 32 may be of various lengths so as to operate properly on various sizes of automobiles.

As shown in FIG. 4, the step assembly 24 is properly positioned on the vehicle 14 when the entrance door 18 is in the closed condition. On moving the door 18 to the open condition as shown in FIG. 5, it is seen that the pivotal connections of the positioning arm member 74 to the anchor plate 71 and the step assembly 24 operates to pivot the same through its bearing assembly 38 connection. This operates to move the step assembly 24 to a position extended substantially in alignment with the support arms 30 and 32 sufficiently revealed so as to be readily used by placing one's foot thereon to aid in entering the vehicle 14.

It is seen that the entrance step apparatus of this invention provides a compact, sturdy structure which can be readily mounted on various types of vehicles such as ambulances, passenger cars, pickup trucks, and other such vehicles. The step apparatus merely requires the use of a movable portion such as an entrance door in order to automatically move the step assembly from the concealed, nonusage condition to the revealed, usage condition. Also, the entrance step apparatus of this invention provides a structure which is sturdy in construction to hold any weight placed thereon, economical to manufacture, simple to install and positive and reliable in operation.

While the invention has been described in conjunction with preferred specific embodiments thereof, it will be understood that this description is intended to illustrate the invention, which is defined by the following claims.

I claim:
1. An entrance step apparatus adapted to be connected between a stationary portion and a movable portion of an entrance area such as the movable door structure on a vehicle, comprising:
  a. a support assembly securable to the stationary portion and including a member when mounted extended substantially laterally therefrom, said member having bearing means mounted in an outer end portion thereof;
  b. a step assembly having one end portion thereof pivotally connected to said bearing means for movement about a substantially vertical axis; and
  c. an actuator assembly having a positioning arm member operably connectable in one end portion to the movable portion and pivotally connected to the step assembly in the other end portion of said step assembly whereby on movement of said movable portion with said entrance apparatus connected said step assembly is pivoted about said bearing means from a concealed position to an extended, revealed position for usage.

2. An entrance step apparatus as described in claim 1, wherein:
  a. said step assembly including a horizontally extended main body of generally rectangular shape having laterally extended connector tab pivotally connected by a bolt member to one end of said positioning arm member; and
  b. said actuator assembly including an anchor plate member secured to the movable portion and having a laterally extended connector tab member pivotally connected to the opposite end of said positioning arm whereby said positioning arm member operates to pivotally move said step assembly about said bearing assembly on moving of the movable portion.

3. An entrance step apparatus as described in claim 2, wherein said positioning arm member extended in a substantially common vertical plane and having opposed end sections extended in spaced, parallel planes, said positioning arm member having a midportion extended downwardly from said anchor plate to said connector tab on main body whereby said step assembly may be concealed vertically underneath the movable portion but extended outwardly therefrom when moved to the usage condition.